United States Patent
Wu et al.

(10) Patent No.: US 12,204,304 B2
(45) Date of Patent: Jan. 21, 2025

(54) METHOD DISTRIBUTION AUTOMATION SYSTEM CONSIDERING RELIABILITY CONSTRAINTS

(71) Applicant: Tsinghua University, Beijing (CN)

(72) Inventors: Wenchuan Wu, Beijing (CN); Boming Zhang, Beijing (CN); Zihao Li, Beijing (CN); Hongbin Sun, Beijing (CN); Bin Wang, Beijing (CN); Qinglai Guo, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 382 days.

(21) Appl. No.: 17/724,473

(22) Filed: Apr. 19, 2022

(65) Prior Publication Data

US 2022/0244692 A1    Aug. 4, 2022

Related U.S. Application Data

(63) Continuation of application No. PCT/CN2020/085971, filed on Apr. 21, 2020.

(30) Foreign Application Priority Data

Apr. 9, 2020    (CN) .......................... 202010272358.5

(51) Int. Cl.
G05B 19/042    (2006.01)

(52) U.S. Cl.
CPC .... G05B 19/042 (2013.01); *G05B 2219/2639* (2013.01)

(58) Field of Classification Search
CPC .......... G05B 19/042; G05B 2219/2639; G05B 23/0294; H02J 3/001; H02J 2203/20; G06Q 10/04; G06Q 50/06
See application file for complete search history.

(56) References Cited

U.S. PATENT DOCUMENTS

2013/0238148 A1* 9/2013 Legbedji ................... H02J 3/14
                                                                700/286
2013/0289772 A1* 10/2013 Friedrich ............... G05B 13/02
                                                                700/291

(Continued)

FOREIGN PATENT DOCUMENTS

| CN | 110210095 | 9/2019 |
| CN | 110210659 | 9/2019 |

OTHER PUBLICATIONS

J. Li, X.-Y. Ma, C.-C. Liu and K. P. Schneider, "Distribution System Restoration With Microgrids Using Spanning Tree Search," in IEEE Transactions on Power Systems, vol. 29, No. 6, pp. 3021-3029, Nov. 2014 (Year: 2014).*

(Continued)

*Primary Examiner* — Christopher E. Everett
(74) *Attorney, Agent, or Firm* — Hodgson Russ LLP (57) ABSTRACT

A planning method for a power distribution automation system based on a reliability constraint is provided. The method includes: defining installation states of components and principles of a fault isolation, a load transfer and a fault recovery after a branch fault occurs; establishing a reliability evaluation optimization model for a power distribution network based on a mixed integer linear programming, the reliability evaluation optimization model comprising a target function and constraint conditions; solving the reliability evaluation optimization model to obtain an optimum planning scheme; and planning the power distribution automation system based on the optimum planning scheme.

19 Claims, 1 Drawing Sheet

(56) References Cited

U.S. PATENT DOCUMENTS

2017/0070044 A1* 3/2017 Wu .......................... H02H 7/26
2018/0254662 A1* 9/2018 Golshani ................ G06Q 50/06

OTHER PUBLICATIONS

S. Ma, S. Li, Z. Wang, A. Arif and K. Ma, "A Novel MILP Formulation for Fault Isolation and Network Reconfiguration in Active Distribution Systems," 2018 IEEE Power & Energy Society General Meeting (PESGM), Portland, OR, USA, 2018, pp. 1-5 (Year: 2018).*

WIPO, International Search Report for PCT/CN2020/085971, Jan. 13, 2021.

* cited by examiner

METHOD DISTRIBUTION AUTOMATION SYSTEM CONSIDERING RELIABILITY CONSTRAINTS

CROSS REFERENCE TO RELATED APPLICATIONS

This application is a continuation of International Patent Application No. PCT/CN2020/085971, filed Apr. 21, 2020, which claims priority to Chinese Patent Application No. 202010272358.5, filed Apr. 9, 2020, the entire disclosures of which are incorporated herein by reference.

FIELD

The present disclosure relates to a field of electronic power system programming and evaluation technologies, and more particularly to a comprehensive programming method for a power distribution automation system based on a reliability constraint.

BACKGROUND

With improvement of a user requirement for a power supply reliability, a power distribution automation system is widely used in an urban power distribution network, which needs a huge investment. Performing lean planning on a device in the power distribution automation system needs to reduce an investment cost as much as possible on the premise of meeting a system reliability requirement. In the power distribution automation system, primary devices mainly include a circuit breaker, a switch, a feeder terminal unit and a control center, and a secondary device is a communication device matched with the power distribution automation system and communicated with each primary device and the control center.

In a field of electric power, the reliability refers to the ability of a power system to continuously meet power demand and quality requirements of end users. The reliability of the power distribution network mainly includes: a customer interruption frequency (CIF), a customer interruption duration (CID), a system average interruption frequency index (SAIFI), a system average interruption duration index (SAIDI), and an expected energy not supplied (EENS).

In a comprehensive planning method for the power distribution automation system currently used, an iterative method of planning calculation and reliability evaluation needs to be used for exploration. Firstly, a planning method is generated and a system reliability index under the planning method is calculated, and then another planning method is generated to recalculate the system reliability index. When a reliability of the latter planning method meets the requirement and the investment cost is lower, the latter planning method is a current optimal method. The above procedure is repeated until the lowest cost solution meeting the reliability requirement is found. In this way, it takes a long time and requires a large storage space. If all the methods may not be traversed, the investment cost may be reduced on the premise of satisfying the system reliability.

SUMMARY

According to an embodiment of the present disclosure, a planning method for a power distribution automation system based on a reliability constraint is provided. The method includes: defining installation states of components and principles of a fault isolation, a load transfer and a fault recovery after a branch fault occurs; establishing a reliability evaluation optimization model for a power distribution network based on a mixed integer linear programming, the reliability evaluation optimization model comprising a target function and constraint conditions; solving the reliability evaluation optimization model to obtain an optimum planning scheme; and planning the power distribution automation system based on the optimum planning scheme.

According to an embodiment of the present disclosure, a planning device for a power distribution automation system based on a reliability constraint is provided. The device includes a processor; and a memory for storing instructions executable by the processor. The processor is configured to perform the planning method fix the power distribution automation system according to the abovementioned embodiment of the present disclosure.

According to an embodiment of the present disclosure, a non-transitory computer-readable storage medium is provided. The non-transitory computer-readable storage medium has stored therein instructions that, when executed by a processor, causes the processor to perform the planning method for the power distribution automation system according to the abovementioned embodiment of the present disclosure.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Embodiments of the present disclosure provide a comprehensive planning method for a power distribution automation system based on a reliability constraint. Detailed description is further made to the present disclosure with reference to detailed embodiments.

Embodiments of the present disclosure provide a comprehensive planning method for a power distribution automation system based on a reliability constraint. A reliability evaluation optimization model for a power distribution network based on the reliability constraint is established, a trial exploration is not employed, and the reliability evaluation optimization model is directly solved, thereby reducing an investment on the premise of satisfying the reliability constraint.

Figure 1:
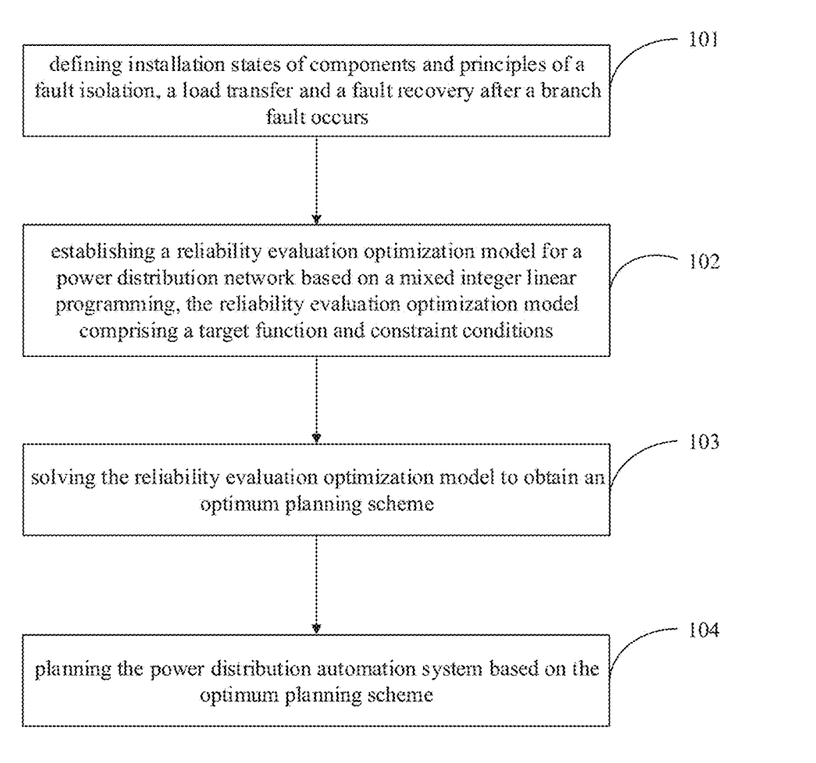
FIG. 1 is a flow chart showing a planning method for a power distribution automation system based on a reliability constraint according to an exemplary embodiment.

According to an embodiment of the present disclosure, a planning method for a power distribution automation system based on a reliability constraint is provided. The method includes steps as follows:

At step 101, installation states of components and principles of a fault isolation, a load transfer and a fault recovery after a branch fault occurs are defined.

At step 102, a reliability evaluation optimization model for a power distribution network is established based on a mixed integer linear programming, the reliability evaluation optimization model including a target function and constraint conditions.

At step 103, the reliability evaluation optimization model is solved to obtain an optimum planning scheme.

At step 104, the power distribution automation system is planned based on the optimum planning scheme.

In some embodiments, defining the installation states of the components and the principles of the fault isolation, the load transfer and the fault recovery after the branch fault occurs comprises:

- installing the circuit breaker and the switch at both ends of a branch, installing the feeder terminal units in the circuit breaker and the switch respectively, the feeder terminal unit being configured to receive an instruction from the control center to control the circuit breaker and the switch to turn on or off, and the circuit breaker being turned off in a normal operating state;
- after the branch fault occurs, disconnecting a circuit breaker closest to a fault branch upstream of the branch, interrupting a fault current, and powering off anode downstream of the circuit breaker;
- in an automatic action stage, turning on or off all the switches installed with the feeder terminal units in the power distribution network for automatic fault isolation, isolating the fault branch, and performing network reconfiguration based on all the switches installed with the feeder terminal units and all the circuit breakers installed with the feeder terminal units to restore a load of the node powered off;
- in a manual action stage, operating all the switches and all the circuit breakers manually to further restore the load of the node powered off; and
- repairing the fault branch, and restoring an original structure of the power distribution network through the switches and the circuit breakers after the fault branch is repaired.

In some embodiments, establishing the reliability evaluation optimization model for the power distribution network based on the mixed integer linear programming comprises:

- determining the target function of the reliability evaluation optimization model; and
- determining the constraint conditions of the reliability evaluation optimization model.

In some embodiments, the target function of the reliability evaluation optimization model is denoted by a formula of:

$$\text{Minimize: } c^{Total} = \sum_{ij \in \bar{\imath}} [c^{CB}(x_{i,ij}^{CB} + x_{j,ij}^{CB}) + c^{SW}(x_{i,ij}^{SW} + x_{j,ij}^{SW}) + c^{FTU}(x_{i,ij}^{FTU} + x_{j,ij}^{FTU})] + c^{CCS} x^{CCS} \quad (1)$$

where $c^{Total}$ represents a comprehensive investment cost of the power distribution network, $c^{CB}$ represents an investment cost of one circuit breaker, $x_{i,ij}^{CB}$ represents a variable 0 or 1 of an installation state of a circuit breaker closest to a node i in a branch ij, $x_{i,ij}^{CB}=1$ represents an installed state of the circuit breaker closest to the node i, $x_{i,ij}^{CB}=0$ represents an uninstalled state of the circuit breaker closest to the node i, $x_{j,ij}^{CB}$ represents a variable 0 or 1 of an installation state of a circuit breaker closest to a node j in the branch ij, $x_{j,ij}^{CB}=0$ represents an installed state of the circuit breaker closest to the node j, $x_{j,ij}^{CB}=0$ represents an uninstalled state of the circuit breaker closest to the node j, $c^{SW}$ represents an investment cost of one switch, $x_{i,ij}^{SW}$ represents a variable 0 or 1 of an installation state of a switch closest to the node i in the branch ij, $x_{i,ij}^{SW}=1$ represents an installed state of the switch closest to the node i, $x_{i,ij}^{SW}=0$ represents an uninstalled state of the switch closest to the node i, $x_{j,ij}^{SW}$ represents a variable 0 or 1 of an installation state of a switch closest to the node j in the branch ij, $x_{j,ij}^{SW}=1$ represents an installed state of the switch closest to the node j, $x_{j,ij}^{SW}=0$ represents an uninstalled state of the switch closest to the node j, $c^{FTU}$ represents an investment cost of one feeder terminal unit, $x_{i,ij}^{FTU}$ represents a variable 0 or 1 of an installation state of a feeder terminal unit closest to the node i in the branch ij, $x_{i,ij}^{FTU}=1$ represents an installed state of the feeder terminal unit closest to the node i, $x_{i,ij}^{FTU}=0$ represents an uninstalled state of the feeder terminal unit closest to the node i, $x_{j,ij}^{FTU}$ represents a variable 0 or 1 of an installation state of a feeder terminal unit closest to the node j in the branch ij, $x_{j,ij}^{FTU}=1$ represents an installed state of the feeder terminal unit closest to the node j, $x_{j,ij}^{FTU}=0$ represents an uninstalled state of the feeder terminal unit closest to the node j, $c^{CCS}$ represents an investment cost of the control center, $x^{CCS}$ represents a variable 0 or 1 of a construction state of the control center, $x^{CCS}=1$ represents a constructed state of the control center, and $x^{CCS}=0$ represents a non-construction state of the control center.

In some embodiments, the constraint conditions of the reliability evaluation optimization model comprises:

- a power balance constraint of the power distribution network;
- a capacity constraint of the branch;
- a capacity constraint of a transformer;
- an action constraint of the circuit breaker;
- an action constraint of the switch;
- a reliability constraint; and
- a device investment constraint.

In some embodiments, the power balance constraint of the power distribution network is denoted by formulas of:

$$D_i^{xy,sc} = \sum_{j \in \Psi_i} P_{ji}^{xy,sc}, \forall i \in \Psi^{LN}, \forall xy \in \Upsilon, sc \in \{A, M\} \quad (2)$$

$$P_{ij}^{xy,sc} = -P_{ji}^{xy,sc}, \forall ij \in \Upsilon, \forall xy \in \Upsilon, sc \in \{A, M\} \quad (3)$$

where a superscript xy represents a scenario where the branch fault occurs in a branch xy; in the $sc \in \{A,M\}$, sc represents a stage, A represents the automatic action stage, and M represents the manual action stage; $D_i^{xy,sc}$ represents a load of a node i when the branch fault occurs in the branch xy, $P_{ji}^{xy,sc}$ represents a power of a branch ij flowing from a node j to the node i when the branch fault occurs in the branch xy, $\Psi_i$ represents a collection of branches directly connected to the node i, $\Psi^{LN}$ represents a collection of load nodes, $\Upsilon$ represents a collection of all the branches, and $\forall xy \in \Upsilon$ represents a scenario where the branch faults occur in all the branches.

In some embodiments, the capacity constraint of the branch is denoted by formulas of:

$$-Ms_{ij}^{i,xy,sc} \leq P_{ij}^{xy,sc} \leq Ms_{ij}^{i,xy,sc}, \forall ij \in \Upsilon, \forall xy \in \Upsilon, sc \in \{A,M\} \quad (4)$$

$$-Ms_{ij}^{j,xy,sc} \leq P_{ij}^{xy,sc} \leq Ms_{ij}^{j,xy,sc}, \forall ij \in \Upsilon, \forall xy \in \Upsilon, sc \in \{A,M\} \quad (5)$$

$$-P_{ij}^{C} \leq P_{ij}^{xy,sc} \leq P_{ij}^{C}, \forall ij \in \Upsilon, \forall xy \in \Upsilon, sc \in \{A,M\} \quad (6)$$

where M represents a positive number, $s_{ij}^{i,xy,sc} \in \{0,1\}$ represents a variable 0 or 1 of a state of a switch closest to a node i in a branch ij when the branch fault occurs in a branch xy, $s_{ij}^{i,xy,sc}=1$ represents a closed state of the switch closest to the node i, $s_{ij}^{i,xy,sc}=0$ represents an open state of the switch closest to the node i, $s_{ij}^{j,xy,sc} \in \{0,1\}$ represents a variable 0 or 1 of a state of a switch closest to a node j in the branch ij when the branch fault occurs in the branch xy, $s_{ij}^{i,xy,sc}=1$ represents a closed state of the switch closest to the node j, $s_{ij}^{j,xy,sc}=0$ represents an open state of the switch closest to the node j, and $P_{ij}^{C}$ represents a rated transmission capacity of the branch ij.

In some embodiments, M ranges from 10000 to 10000000.

In some embodiments, the capacity constraint of the transformer is denoted by formulas of:

$$P_f^{xy,sc}=P_{tr^f}^{xy,sc}, \forall f\in \Psi^F, tr^f\in \Upsilon \ \forall xy\in \Upsilon,\ sc\in \{A,M\} \quad (7)$$

$$P_f^{xy,sc}\leq P_f^C,\ \forall f\in \Psi^F,\ \forall xy\in \Upsilon\ sc\in \{A,M\} \quad (8)$$

where $P_f^{xy,sc}$ represents a power of a transformer, f when the branch fault occurs in a branch xy, $P_{tr^f}^{xy,sc}$ represents a power of a branch, $tr^f$ connected to the transformer and flowing from a transformer node to a downstream node when the branch fault occurs in the branch xy, and $\Psi^F$ represents a collection of all the transformer nodes.

In some embodiments, the action constraint of the circuit breaker is denoted by formulas of:

$$F_{xy}^{xy,B}=0 \quad (9)$$

$$-(2-b_{ij}^{i,xy}-s_{ij}^{i,NO})M+F_i^{xy,B}\leq F_{ij}^{xy,B}\leq (2-b_{ij}^{i,xy}-s_{ij}^{i,NO})M+F_i^{xy,B}, \quad (10)$$

$$\forall ij\in \Upsilon$$

$$-(2-b_{ij}^{j,xy}-s_{ij}^{j,NO})M+F_j^{xy,B}\leq F_{ij}^{xy,B}\leq (2-b_{ij}^{j,xy}-s_{ij}^{j,NO})M+F_j^{xy,B}, \quad (11)$$

$$\forall ij\in \Upsilon$$

$$2n^{BR}-1=\sum_{ij\in \Upsilon}(b_{ij}^{i,xy}+b_{ij}^{j,xy}) \quad (12)$$

$$0\leq F_i^{xy,B}\leq 1,\ \forall i\in \Psi^{LN} \quad (13)$$

$$0\leq F_{ij}^{xy,B}\leq 1,\ \forall ij\in \Upsilon \quad (14)$$

$$F_i^{xy,B}=1,\ \forall i\in \Psi^{SS} \quad (15)$$

$$p_i^{xy}=1-F_i^{xy,B},\ \forall i\in \Psi^{LN} \quad (16)$$

where $\forall xy\in \Upsilon$;

$F_{ij}^{xy,B}$ represents a variable 0 or 1 of a fault effect marker of a branch ij in an action stage of the circuit breaker when the branch fault occurs in a branch xy, $F_{ij}^{xy,B}=0$ represents that the branch ij is in a power-off state due to fault effect when the branch fault occurs in the branch xy, $F_{ij}^{xy,B}=1$ represents that the branch ij is in a normal operating state when the branch fault occurs in the branch xy, $F_i^{xy,B}$ represents a variable 0 or 1 of a fault effect marker of a node i in the action stage of the circuit breaker when the branch fault occurs in the branch xy, $F_i^{xy,B}=0$ represents that the node i is in a power-off state due to a fault effect when the branch fault occurs in the branch xy, $F_i^{xy,B}=1$ represents that the node i is in a normal operating state when the branch fault occurs in the branch xy, $F_j^{xy,B}$ represents a variable 0 or 1 of a fault effect marker of a node j in the action stage of the circuit breaker when the branch fault occurs in the branch xy, $F_j^{xy,B}=0$ represents that the node j is in a power-off state due to a fault effect when the branch fault occurs in the branch xy, $F_j^{xy,B}=1$ represents that the node j is in a normal operating state when the branch fault occurs in the branch xy, a superscript B represents the action stage of the circuit breaker, $n^{BR}$ represents a number of branches of the power distribution network, and $\Psi^{SS}$ represents a set of substation nodes;

$s_{ij}^{i,NO}$ represents a variable 0 or 1 of a state of a switch closest to the node i in the branch ij in the normal operating state, $s_{ij}^{i,NO}=1$ represents a closed state of the switch closest to the node i, $s_{ij}^{i,NO}=0$ represents an open state of the switch closest to the node i, $s_{ij}^{j,NO}=0$ represents a variable 0 or 1 of a state of a switch closest to a node j in the branch ij in the normal operating state, $s_{ij}^{j,NO}=1$ represents a closed state of the switch closest to the node j, $s_{ij}^{j,NO}=0$ represents an open state of the switch closest to the node j, and a superscript NO represents that the branch ij is in the normal operating state;

$b_{ij}^{i,xy}$ represents a variable 0 or 1 of a state of a circuit breaker closest to the node i in the branch ij when the branch fault occurs in the branch xy, $b_{ij}^{i,xy}=1$ represents an off state of the circuit breaker closest to the node i, $b_{ij}^{i,xy}=0$ represents an on state of the circuit breaker closest to the node i, $b_{ij}^{j,xy}$ represents a variable 0 or 1 of a state of a circuit breaker closest to the node j in the branch ij when the branch fault occurs in the branch xy, $b_{ij}^{j,xy}=1$ represents an off state of the circuit breaker closest to the node j, and $b_{ij}^{j,xy}=0$ represents an on state of the circuit breaker closest to the node j; and $p_i^{xy}$ represents a variable 0 or 1 of a fault effect marker of the node i when the branch fault occurs in the branch xy, $p_i^{xy}=1$ represents that the node i is affected by the branch fault when the branch fault occurs in the branch xy, and $p_i^{xy}=0$ represents that the node i is not affected by the branch fault when the branch fault occurs in the branch xy.

In some embodiments, the action constraint of the switch is denoted by formulas of:

$$F_{xy}^{xy,sc}=0,\ sc\in \{A,M\} \quad (17)$$

$$-(1-s_{ij}^{i,xy,sc})M+F_i^{xy,sc}\leq F_{ij}^{xy,sc}\leq (1-s_{ij}^{i,xy,sc})M+F_i^{xy,sc},$$
$$\forall ij\in \Upsilon,\ sc\in \{A,M\} \quad (18)$$

$$-(1-s_{ij}^{j,xy,sc})M+F_j^{xy,sc}\leq F_{ij}^{xy,sc}\leq (1-s_{ij}^{j,xy,sc})M+F_j^{xy,sc},$$
$$\forall ij\in \Upsilon,\ sc\in \{A,M\} \quad (19)$$

$$0\leq F_i^{xy,sc}\leq 1,\ \forall i\in \Psi^{LN},\ sc\in \{A,M\} \quad (20)$$

$$0\leq F_{ij}^{xy,sc}\leq 1,\ \forall ij\in \Upsilon,\ sc\in \{A,M\} \quad (21)$$

$$F_i^{xy,sc}=1,\ \forall i\in \Psi^{SS},\ sc\in \{A,M\} \quad (22)$$

$$D_i^{xy,sc}D_iq_i^{xy,sc},\ \forall i\in \Psi^{LN},\ sc\in \{A,M\} \quad (23)$$

$$q_i^{xy,sc}=F_i^{xy,sc},\ \forall i\in \Psi^{LN},\ sc\in \{A,M\} \quad (24)$$

$$1-p_i^{xy}\leq q_i^{xy,A}\leq q_i^{xy,M},\ \forall i\in \Psi^{LN} \quad (25)$$

where $\forall xy\in \Upsilon$;

$F_{ij}^{xy,sc}$ represents a variable 0 or 1 of a maintenance effect marker of a branch ij in the automatic action stage sc=A or in the manual action stage sc=M after the branch fault occurs in a branch xy, $F_{ij}^{xy,sc}=0$ represents that the branch ij is in a power-off state due to maintenance for the branch xy after the branch fault occurs in the branch xy, $F_{ij}^{xy,sc}=1$ represents that the branch ij is not affected by the maintenance for the branch xy and is in a normal operating state after the branch fault occurs in the branch xy, $F_i^{xy,sc}$ represents a variable 0 or 1 of a maintenance effect marker of a node i in the automatic action stage sc=A or in the manual action stage sc=M after the branch fault occurs in the branch xy, $F_i^{xy,sc}=0$ represents that the node i is in a power-off state due to the maintenance for the branch xy after the branch fault occurs in the branch xy, $F_i^{xy,sc}=1$ represents that the node i is not affected by the maintenance for the branch xy and is in a normal operating state after the branch fault occurs in the branch xy, $F_j^{xy,sc}$ represents a variable 0 or 1 of a maintenance effect marker of a node j after the branch fault occurs in the branch xy, $F_j^{xy,sc}=0$ represents that the node j is in a power-off state due to the maintenance for the branch xy after the branch fault occurs in the branch xy, and $F_j^{xy,sc}=1$ represents that the node j is not affected by the maintenance for the branch xy and is in a normal operating state after the branch fault occurs in the branch xy; and $q_i^{xy,sc}$ represents a variable 0 or 1 of a power-supply marker of the node i in the automatic action stage sc=A or in the manual action stage sc=M after the branch fault occurs in the branch xy, $q_i^{xy,sc}=1$ represents a normal power-supply state of the node i after the branch fault occurs in the branch xy and a switching action is performed, $q_i^{xy,sc}=0$ represents that the node i is in the power-off state after the branch fault occurs in the branch xy and the switching action is performed.

In some embodiments, the reliability constraint is denoted by formulas of:

$$CID_i = \sum_{xy \in \Upsilon} \lambda_{xy} \begin{bmatrix} \tau_{xy}^{AST} p_i^{xy} + (\tau_{xy}^{MST} - \tau_{xy}^{AST})(1 - q_i^{xy,A}) + \\ (\tau_{xy}^{RP} - \tau_{xy}^{MST})(1 - q_i^{xy,M}) \end{bmatrix}, \forall i \in \Psi^{LN} \quad (26)$$

$$CIF_i = \sum_{xy \in \Upsilon} \lambda_{xy} p_i^{xy}, \forall i \in \Psi^{LN} \quad (27)$$

$$SAIDI = \frac{\sum_{i \in \Psi^{LN}} NC_i CID_i}{\sum_{i \in \Psi^{LN}} NC_i} \quad (28)$$

$$SAIFI = \frac{\sum_{i \in \Psi^{LN}} NC_i CIF_i}{\sum_{i \in \Psi^{LN}} NC_i} \quad (29)$$

$$ASAI = 1 - \frac{SAIDI}{8760} \quad (30)$$

$$EENS = \sum_{h \in B} \frac{\Delta h}{8760} \sum_{i \in \Psi^{LN}} CID_i \mu_h L_i \quad (31)$$

$$CIF_i \leq \varepsilon_i^{CIF}, \forall i \in \Psi^{LN} \quad (32)$$

$$CID_i \leq \varepsilon_i^{CID}, \forall i \in \Psi^{LN} \quad (33)$$

$$SAIFI \leq \varepsilon^{SAIFI} \quad (34)$$

$$SAIDI \leq \varepsilon^{SAIDI} \quad (35)$$

$$EENS \leq \varepsilon^{EENS} \quad (36)$$

where $CID_i$ represents a customer interruption duration of a node i, $\lambda_{xy}$ represents an annual fault rate of a branch xy, $\tau_{xy}^{AST}$ represents an interruption duration of the branch xy in the automatic action stage for the branch fault, $\tau_{xy}^{MST}$ represents an interruption duration of the branch xy in the manual action stage for the branch fault, $\tau_{xy}^{RP}$ represents an interruption duration of the branch xy in a fault maintenance, $CIF_i$ represents a customer interruption frequency of the node i, $NC_i$ represents a number of customers of the node i, SAIDI represents a system average interruption duration index, SAIFI represents a system average interruption frequency index, ASAI represents a system average power-supply index, EENS represents an expected energy not supplied, B represents a collection of all load levels, $\Delta_h$ represents a number of annual duration hours of a load level h, $\mu_h \leq 1$ represents a peak load ratio of the load level h, and $L_i$ represents a peak load of the node i; and $\varepsilon_i^{CIF}$ represents an upper limit of the customer interruption frequency of the node i, $\varepsilon_i^{CID}$ represents an upper limit of the customer interruption duration of the node i, $\varepsilon^{SAIFI}$ represents an upper limit of the system average interruption frequency index, $\varepsilon^{SAIDI}$ represents an upper limit of the system average interruption duration index, and $\varepsilon^{EENS}$ represents an upper limit of the expected energy not supplied.

In some embodiments, the device investment constraint is denoted by formulas of:

$$b_{ij}^{i,xy} \geq 1 - x_{i,ij}^{CB}, \forall ij \in \Upsilon \quad (37)$$

$$b_{ij}^{j,xy} \geq 1 - x_{j,ij}^{CB}, \forall ij \in \Upsilon \quad (38)$$

$$s_{ij}^{i,xy,A} \geq b_{ij}^{i,xy} + 1 - s_{ij}^{i,NO} - x_{i,ij}^{FTU}, \forall ij \in \Upsilon \quad (39)$$

$$s_{ij}^{j,xy,A} \geq b_{ij}^{j,xy} + 1 - s_{ij}^{j,NO} - x_{j,ij}^{FTU}, \forall ij \in \Upsilon \quad (40)$$

$$s_{ij}^{i,xy,A} \leq b_{ij}^{i,xy} + 1 - s_{ij}^{i,NO} + x_{i,ij}^{FTU}, \forall ij \in \Upsilon \quad (41)$$

$$s_{ij}^{j,xy,A} \leq b_{ij}^{j,xy} + 1 - s_{ij}^{j,NO} + x_{j,ij}^{FTU}, \forall ij \in \Upsilon \quad (42)$$

$$s_{ij}^{i,xy,M} \geq 1 - x_{i,ij}^{SW}, \forall ij \in \Upsilon \quad (43)$$

$$s_{ij}^{j,xy,M} \geq 1 - x_{j,ij}^{SW}, \forall ij \in \Upsilon \quad (44)$$

$$s_{ij}^{i,NO} \geq 1 - x_{i,ij}^{SW}, \forall ij \in \Upsilon \quad (45)$$

$$s_{ij}^{j,NO} \geq 1 - x_{j,ij}^{SW}, \forall ij \in \Upsilon \quad (46)$$

$$x_{i,ij}^{SW} \geq x_{i,ij}^{FTU}, \forall ij \in \Upsilon \quad (47)$$

$$x_{j,ij}^{SW} \geq x_{j,ij}^{FTU}, \forall ij \in \Upsilon \quad (48)$$

$$\sum_{ij \in \Upsilon} (x_{i,ij}^{RTU} + x_{j,ij}^{RTU}) \leq Mx^{CCS} \quad (49)$$

$$x_{i,ij}^{SW} \geq x_{i,ij}^{CB}, \forall ij \in \Upsilon \quad (50)$$

$$x_{j,ij}^{SW} \geq x_{j,ij}^{CB}, \forall ij \in \Upsilon \quad (51).$$

In some embodiments, solving the reliability evaluation optimization model to obtain an optimum planning scheme comprises:

solving the reliability evaluation optimization model to obtain optimum solutions of $x_{i,ij}^{CB}$, $x_{j,ij}^{CB}$, $x_{i,ij}^{SW}$, $x_{j,ij}^{SW}$, $x_{i,ij}^{FTU}$, $x_{i,ij}^{FTU}$, $x^{CCS}$, $CID_i$, $CIF_i$, SAIDI, SAIFI, ASAI and EENS, wherein the optimum solutions of and $x_{i,ij}^{CB}$ and $x_{j,ij}^{CB}$ are optimum results of a planning installation state of a circuit breaker, the optimum solutions of $x_{i,ij}^{SW}$ and $x_{j,ij}^{SW}$ are optimum results of a planning installation state of a switch, the optimum solutions of $x_{i,ij}^{FTU}$ and $x_{j,ij}^{FTU}$ are optimum results of a planning installation state of a feeder terminal unit, the optimum solution of $x^{CCS}$ is an optimum result of a planning installation state of a control center, and the optimum solutions of $CID_i$, $CIF_i$, SAIDI, SAIFI, ASAI and EENS are optimum results of a reliability index of the planning scheme.

The technical solution provided by embodiments of the present disclosure includes following advantageous effects.

The present disclosure takes the investment cost of the power distribution network as the target function, and the comprehensive planning for the automation system of the power distribution network is modeled as a mixed integer linear programming model. The reliability mixed integer linear programming model is solved, which may directly obtain a planning result meeting the reliability constraint. When the reliability constraint is calculated, the method takes into account a trip of the circuit breaker after a fault, a fault automation, a manual isolation and a restoration of power supply to an affected load based on network reconfiguration. The method is simple and convenient, and may effectively reduce the investment cost on the premise of ensuring the system reliability.

Embodiments of the present disclosure provide a comprehensive planning method for a power distribution automation system based on a reliability constraint. The method includes followings.

(1) Installation states of components and principles of a fault isolation, a load transfer and a fault recovery after a branch fault occurs are defined, which includes followings.

(1-1) The circuit breaker (supplying or interrupting a fault current) and the switch (each switch including a segmented switch and a contact switch, and being not capable of supplying or interrupting the fault current) are installed at both ends of a branch, and the feeder terminal units (FTUs) are respectively installed in the circuit breaker and the switch. The feeder terminal unit is configured to receive an instruction from a control center to control the circuit breaker and the switch to turn on or off, and the circuit breaker is turned off in a normal operating state.

(1-2) After the branch fault occurs, firstly, in an action stage of the circuit breaker, a circuit breaker closest to a fault branch upstream of the branch is disconnected, a fault current is interrupted, and a node downstream of the circuit breaker is powered off. Then, in an automatic action stage, all the switches installed with the feeder terminal units in a power distribution network are turned on or off for automatic fault isolation, the fault branch is isolated, and network reconfiguration is performed based on all the switches installed with the feeder terminal units and all the circuit breakers installed with the feeder terminal units to restore a load of the node powered off. Afterwards, in a manual action stage, all the switches and all the circuit breakers are manually operated to further restore the load of the node powered off. Finally, the fault branch is repaired, and an original structure of the power distribution network is restored through the switches and the circuit breakers after the fault branch is repaired.

(2) A reliability evaluation optimization model for a power distribution network is established based on a mixed integer linear programming, and the reliability evaluation optimization model includes a taret function and constraint conditions, of which detailed actions include following.

(2-1) The target function of the reliability evaluation optimization model is determined.

The target function of the reliability evaluation optimization model is a minimal comprehensive investment cost $c^{Total}$ of the power distribution network, and denoted by a formula of:

$$\text{Minimize: } c^{Total} = \sum_{ij \in \Upsilon} [c^{CB}(x_{i,ij}^{CB} + x_{j,ij}^{CB}) + c^{SW}(x_{i,ij}^{SW} + x_{j,ij}^{SW}) + c^{FTU}(x_{i,ij}^{FTU} + x_{j,ij}^{FTU})] + c^{CCS} x^{CCS} \quad (1)$$

where $c^{CB}$ represents an investment cost of one circuit breaker, $x_{i,ij}^{CB}$ represents a variable (0 or 1) of an installation state of a circuit breaker closest to a node i in a branch ij, $x_{i,ij}^{CB}=1$ represents an installed state of the circuit breaker closest to the node i, $x_{i,ij}^{CB}=0$ represents an uninstalled state of the circuit breaker closest to the node i, $x_{j,ij}^{CB}$ represents a variable (0 or 1) of an installation state of a circuit breaker closest to a node j in the branch ij, $x_{j,ij}^{CB}=1$ represents an installed state of the circuit breaker closest to the node j, $x_{j,ij}^{CB}=0$ represents an uninstalled state of the circuit breaker closest to the node j, $c^{SW}$ represents an investment cost of one switch, $x_{i,ij}^{SW}$ represents a variable (0 or 1) of an installation state of a switch closest to the node i in the branch ij, $x_{i,ij}^{SW}=1$ represents an installed state of the switch closest to the node i, $x_{i,ij}^{SW}=0$ represents an uninstalled state of the switch closest to the node i, $x_{j,ij}^{SW}$ represents a variable (0 or 1) of an installation state of a switch closest to the node j in the branch ij, $x_{j,ij}^{SW}=1$ represents an installed state of the switch closest to the node j, $x_{j,ij}^{SW}=0$ represents an uninstalled state of the switch closest to the node j, $c^{FTU}$ represents an investment cost of one feeder terminal unit, $x_{i,ij}^{FTU}$ represents a variable (0 or 1) of an installation state of a feeder terminal unit closest to the node i in the branch ij, $x_{i,ij}^{FTU}=1$ represents an installed state of the feeder terminal unit closest to the node i, $x_{i,ij}^{FTU}=0$ represents an uninstalled state of the feeder terminal unit closest to the node i, $x_{j,ij}^{FTU}$ represents a variable (0 or 1) of an installation state of a feeder terminal unit closest to the node j in the branch ij, $x_{j,ij}^{FTU}=1$ represents an installed state of the feeder terminal unit closest to the node j, $x_{j,ij}^{FTU}=0$ represents an uninstalled state of the feeder terminal unit closest to the node j, $c^{CCS}$ represents an investment cost of the control center, $x^{CCS}$ represents a variable (0 or 1) of a construction state of the control center, $x^{CCS}=1$ represents a constructed state of the control center, and $x^{CCS}=0$ represents a non-construction state of the control center.

(2-2) The constraint conditions of the reliability evaluation optimization model are determined. The constraint conditions include a power balance constraint of the power distribution network, a capacity constraint of the branch, a capacity constraint of a transformer, an action constraint of the circuit breaker, an action constraint of the switch, a reliability constraint, and a device investment constraint.

(2-2-1) The power balance constraint of the power distribution network is denoted by formulas of:

$$D_i^{xy,sc} = \sum_{j \in \Psi_i} P_{ji}^{xy,sc}, \forall i \in \Psi^{LN}, \forall xy \in \Upsilon, sc \in \{A, M\} \quad (2)$$

$$P_{ij}^{xy,sc} = -P_{ji}^{xy,sc}, \forall ij \in \Upsilon, \forall xy \in \Upsilon, sc \in \{A, M\} \quad (3)$$

where a superscript xy represents a scenario where the branch fault occurs in a branch xy; in the sc∈{A,M}, sc represents a stage. A represents the automatic action stage, and M represents the manual action stage; $D_i^{xy,sc}$ represents a load of a node i when the branch fault occurs in the branch xy, $P_{ji}^{xy,sc}$ represents a power of a branch ij flowing from a node j to the node i when the branch fault occurs in the branch xy, $\Psi_i$ represents a collection of branches directly connected to the node i, $\Psi^{LN}$ represents a collection of load nodes, $\Upsilon$ represents a collection of all the branches, and $\forall xy \in \Upsilon$ represents a scenario where the branch faults occur in all the branches.

(2-2-2) The capacity constraint of the branch is denoted by formulas of:

$$-Ms_{ij}^{i,xy,sc} \leq P_{ij}^{xy,sc} \leq Ms_{ij}^{i,xy,sc}, \forall ij \in \Upsilon, \forall xy \in \Upsilon, sc \in \{A,M\} \quad (4)$$

$$-Ms_{ij}^{j,xy,sc} \leq P_{ij}^{xy,sc} \leq Ms_{ij}^{j,xy,sc}, \forall ij \in \Upsilon, \forall xy \in \Upsilon, sc \in \{A,M\} \quad (5)$$

$$-P_{ij}^{C} \leq P_{ij}^{xy,sc} \leq P_{ij}^{C}, \forall ij \in \Upsilon, xy \in \Upsilon, sc \in \{A,M\} \quad (6)$$

where M represents any number with a larger value (ranging from 10000 to 10000000, taken as 1000000 in an embodiment), $s_{ij}^{i,xy,sc} \in \{0,1\}$ represents a variable (0 or 1) of a state of a switch closest to the node i in the branch ij when the branch fault occurs in the branch xy, $s_{ij}^{i,xy,sc}=1$ represents a closed state of the switch closest to the node i, $s_{ij}^{i,xy,sc}=0$ represents an open state of the switch closest to the node i, $s_{ij}^{j,xy,sc} \in \{0,1\}$ represents a variable (0 or 1) of a state of a switch closest to the node j in the branch ij when the branch fault occurs in the branch xy, $s_{ij}^{j,xy,sc}=1$ represents a closed state of the switch closest to the node j, $s_{ij}^{j,xy,sc}=0$ represents an open state of the switch closest to the node j, and $P_{ij}^{C}$ represents a rated transmission capacity of the branch ij.

(2-2-3) The capacity constraint of the transformer is denoted by formulas of:

$$P_f^{xy,sc}=P_{tr^f}^{xy,sc}, \forall f\in \Psi^F, tr^f\in \Upsilon, \forall xy\in \Upsilon, sc\in\{A,M\} \quad (7)$$

$$P_f^{xy,sc}\leq P_f^C, \forall f\in\Psi^F, \forall xy\in \Upsilon, sc\in\{A,M\} \quad (8)$$

where $P_f^{xy,sc}$ represents the power flow of a transformer f when the branch fault occurs in the branch xy, represents $P_{tr^f}^{xy,sc}$ the power flow of a branch $tr^f$ connected to the transformer and flowing from a transformer node to a downstream node when the branch fault occurs in the branch xy, and $\Psi^F$ represents a collection of all the transformer nodes.

(2-2-4) The action constraint of the circuit breaker is denoted by formulas of:

$$F_{xy}^{xy,B}=0 \quad (9)$$

$$-(2-b_{ij}^{i,xy}-s_{ij}^{i,NO})M+F_i^{xy,B}\leq F_{ij}^{xy,B}\leq (2-b_{ij}^{i,xy}-s_{ij}^{i,NO})M+F_i^{xy,B}, \quad (10)$$

$$\forall ij\in\Upsilon$$

$$-(2-b_{ij}^{j,xy}-s_{ij}^{j,NO})M+F_j^{xy,B}\leq F_{ij}^{xy,B}\leq (2-b_{ij}^{j,xy}-s_{ij}^{j,NO})M+F_j^{xy,B}, \quad (11)$$

$$\forall ij\in\Upsilon$$

$$2n^{BR}-1=\sum_{ij\in\Upsilon}(b_{ij}^{i,xy}+b_{ij}^{j,xy}) \quad (12)$$

$$0\leq F_i^{xy,B}\leq 1, \forall i\in\Psi^{LN} \quad (13)$$

$$0\leq F_{ij}^{xy,B}\leq 1, \forall ij\in\Upsilon \quad (14)$$

$$F_i^{xy,B}=1, \forall i\in\Psi^{SS} \quad (15)$$

$$p_i^{xy}=1-F_i^{xy,B}, \forall i\in\Psi^{LN} \quad (16)$$

where $\forall xy\in\Upsilon$;

$F_{ij}^{xy,B}$ represents a variable (0 or 1) of a fault effect marker of the branch ij in an action stage (a superscript B) of the circuit breaker when the branch fault occurs in the branch xy, $F_{ij}^{xy,B}=0$ represents that the branch ij is in a power-off state due to a fault effect when the branch fault occurs in the branch xy, $F_{ij}^{xy,B}=1$ represents that the branch ij is in a normal operating state when the branch fault occurs in the branch xy, $F_i^{xy,B}$ represents a variable (0 or 1) of a fault effect marker of the node i in the action stage of the circuit breaker when the branch fault occurs in the branch xy, $F_i^{xy,B}=0$ represents that the node i is in a power-off state due to a fault effect when the branch fault occurs in the branch xy, $F_i^{xy,B}=1$ represents that the node i is in a normal operating state when the branch fault occurs in the branch xy, $F_j^{xy,B}$ represents a variable (0 or 1) of a fault effect marker of the node j in the action stage of the circuit breaker when the branch fault occurs in the branch xy, $F_j^{xy,B}=0$ represents that the node j is in a power-off state due to a fault effect when the branch fault occurs in the branch xy, $F_j^{xy,B}=1$ represents that the node j is in a normal operating state when the branch fault occurs in the branch xy, $n^{BR}$ represents a number of branches of the power distribution network, and $\Psi^{SS}$ represents a set of substation nodes;

$s_{ij}^{i,NO}$ represents a variable (0 or 1) of a state of a switch closest to the node i in the branch ij in the normal operating state (a superscript NO), $s_{ij}^{i,NO}=1$ represents a closed state of the switch closest to the node i, $s_{ij}^{i,NO}=0$ represents an open state of the switch closest to the node i, $s_{ij}^{j,NO}$ represents a variable (0 or 1) of a state of a switch closest to the node j in the branch ij in the normal operating state (the superscript NO), $s_{ij}^{j,NO}=1$ represents a closed state of the switch closest to the node j, and $s_{ij}^{j,NO}=0$ represents an open state of the switch closest to the node j;

$b_{ij}^{i,xy}$ represents a variable (0 or 1) of a state of a circuit breaker closest to the node i in the branch ij when the branch fault occurs in the branch xy, $b_{ij}^{i,xy}=1$ represents an off state of the circuit breaker closest to the node i, $b_{ij}^{i,xy}=0$ represents an on state of the circuit breaker closest to the node i, $b_{ij}^{j,xy}$ represents a variable (0 or 1) of a state of a circuit breaker closest to the node j in the branch ij when the branch fault occurs in the branch xy, $b_{ij}^{j,xy}=1$ represents an off state of the circuit breaker closest to the node j, and $b_{ij}^{j,xy}=0$ represents an on state of the circuit breaker closest to the node j; and $p_i^{xy}$ represents a variable (0 or 1) of a fault effect marker of the node i when the branch fault occurs in the branch xy, $p_i^{xy}=1$ represents that the node i is affected by the branch fault when the branch fault occurs in the branch xy, and $p_i^{xy}=0$ represents that the node i is not affected by the branch fault when the branch fault occurs in the branch xy.

(2-2-5) The action constraint of the switch is denoted by formulas of:

$$F_{xy}^{xy,sc}=0, sc\in\{A,M\} \quad (17)$$

$$-(1-s_{ij}^{i,xy,sc})M+F_i^{xy,sc}\leq F_{ij}^{xy,sc}\leq(1-s_{ij}^{i,xy,sc})M+F_i^{xy,sc},$$

$$\forall ij\in\Upsilon, sc\in\{A,M\} \quad (18)$$

$$-(1-s_{ij}^{j,xy,sc})M+F_j^{xy,sc}\leq F_{ij}^{xy,sc}\leq(1-s_{ij}^{j,xy,sc})M+F_j^{xy,sc},$$

$$\forall ij\in\Upsilon, sc\in\{A,M\} \quad (19)$$

$$0\leq F_i^{xy,sc}\leq 1, \forall i\in\Psi^{LN}, sc\in\{A,M\} \quad (20)$$

$$0\leq F_{ij}^{xy,sc}\leq 1, \forall ij\in\Upsilon, sc\in\{A,M\} \quad (21)$$

$$F_i^{xy,sc}=1, \forall i\in\Psi^{SS}, sc\in\{A,M\} \quad (22)$$

$$D_i^{xy,sc}D_i q_i^{xy,sc}, \forall i\in\Psi^{LN}, sc\in\{A,M\} \quad (23)$$

$$q_i^{xy,sc}=F_i^{xy,sc}, \forall i\in\Psi^{LN}, sc\in\{A,M\} \quad (24)$$

$$1-p_i^{xy}\leq q_i^{xy,A}\leq q_i^{xy,M}, \forall i\in\Psi^{LN} \quad (25)$$

where $\forall xy\in\Upsilon$;

$F_{ij}^{xy,sc}$ represents a variable (0 or 1) of a maintenance effect marker of the branch ij in the automatic action stage (a superscript sc=A) or in the manual action stage (a superscript sc=M) after the branch fault occurs in the branch xy, $F_{ij}^{xy,sc}=0$ represents that the branch ij is in a power-off state due to maintenance for the branch xy after the branch fault occurs in the branch xy, $F_{ij}^{xy,sc}=1$ represents that the branch ij is not affected by the maintenance for the branch xy and is in a normal operating state after the branch fault occurs in the branch xy, $F_i^{xy,sc}$ represents a variable (0 or 1) of a maintenance effect marker of the node i after the branch fault occurs in the branch xy, $F_i^{xy,sc}=0$ represents that the node i is in a power-off state due to the maintenance for the branch xy after the branch fault occurs in the branch xy, $F_i^{xy,sc}=1$ represents that the node i is not affected by the maintenance for the branch xy and is in a normal operating state after the branch fault occurs in the branch xy, $F_j^{xy,sc}$ represents a variable (0 or 1) of a maintenance effect marker of the node j after the branch fault occurs in the branch xy, $F_j^{xy,sc}=0$ represents that the node j is in a power-off state due to the maintenance for the branch xy after the branch fault occurs in the branch xy, and $F_j^{xy,sc}=1$ represents that the node j is not affected by the maintenance for the branch xy and is in a normal operating state after the branch fault occurs in the branch xy; and $q_i^{xy,sc}$ represents a variable (0 or 1) of a power-supply marker of the node i in the automatic action stage sc=A or in the manual action stage sc=M after the branch fault occurs in the branch xy, $q_i^{xy,sc}=1$ represents a normal power-supply state of the node i after the branch fault occurs in the branch xy and a switching action is performed, $q_i^{xy,sc}=0$ represents that the node i is in the power-off state after the branch fault occurs in the branch xy and the switching action is performed.

(2-2-6) The reliability constraint is denoted by formulas of:

$$CID_i = \sum_{xy \in \Upsilon} \lambda_{xy} \begin{bmatrix} \tau_{xy}^{AST} p_i^{xy} + (\tau_{xy}^{MST} - \tau_{xy}^{AST})(1 - q_i^{xy,A}) + \\ (\tau_{xy}^{RP} - \tau_{xy}^{MST})(1 - q_i^{xy,M}) \end{bmatrix}, \forall i \in \Psi^{LN} \quad (26)$$

$$CIF_i = \sum_{xy \in \Upsilon} \lambda_{xy} p_i^{xy}, \forall i \in \Psi^{LN} \quad (27)$$

$$SAIDI = \frac{\sum_{i \in \Psi^{LN}} NC_i CID_i}{\sum_{i \in \Psi^{LN}} NC_i} \quad (28)$$

$$SAIFI = \frac{\sum_{i \in \Psi^{LN}} NC_i CIF_i}{\sum_{i \in \Psi^{LN}} NC_i} \quad (29)$$

$$ASAI = 1 - \frac{SAIDI}{8760} \quad (30)$$

$$EENS = \sum_{h \in B} \frac{\Delta h}{8760} \sum_{i \in \Psi^{LN}} CID_i \mu_h L_i \quad (31)$$

$$CIF_i \leq \varepsilon_i^{CIF}, \forall i \in \Psi^{LN} \quad (32)$$

$$CID_i \leq \varepsilon_i^{CID}, \forall i \in \Psi^{LN} \quad (33)$$

$$SAIFI \leq \varepsilon^{SAIFI} \quad (34)$$

$$SAIDI \leq \varepsilon^{SAIDI} \quad (35)$$

$$EENS \leq \varepsilon^{EENS} \quad (36)$$

where $CID_i$ represents a customer interruption duration of the node i, $\lambda_{xy}$ represents an annual fault rate of the branch xy, $\tau_{xy}^{AST}$ represents an interruption duration (from a time at which the fault occurs to a time at which the circuit breaker and the switch act automatically under the control of the feeder terminal unit) of the branch xy in the automatic action stage for the branch fault, $\tau_{xy}^{MST}$ represents an interruption duration (from the time at which the fault occurs to a time at which the circuit breaker and the switch act manually) of the branch xy in the manual action stage for the branch fault, $\tau_{xy}^{RP}$ represents an interruption duration (from the time at which the fault occurs to a time at which the fault is repaired) of the branch xy in a fault maintenance, $CIF_i$ represents a customer interruption frequency of the node i, $NC_i$ represents a number of customers of the node i, SAIDI represents a system average interruption duration index, SAIFI represents a system average interruption frequency index, ASAI represents a system average power-supply index, EENS represents an expected energy not supplied, B represents a collection of all load levels, $\Delta_h$ represents a number of annual duration hours of a load level h, $\mu_h \leq 1$ represents a peak load ratio of the load level h and $L_i$ represents a peak load of the node i; and $\varepsilon_i$ represents an upper limit of the customer interruption frequency of the node i, $\varepsilon_i^{CID}$ represents an upper limit of the customer interruption duration of the node i, $\varepsilon^{SAIFI}$ represents an upper limit of the system average interruption frequency index, $\varepsilon^{SAIDI}$ represents an upper limit of the system average interruption duration index, and $\varepsilon^{EENS}$ represents an upper limit of the expected energy not supplied.

(2-2-7) The device investment constraint is denoted by formulas of:

$$b_{ij}^{i,xy} \geq 1 - x_{i,ij}^{CB}, \forall ij \in \Upsilon \quad (37)$$

$$b_{ij}^{j,xy} \geq 1 - x_{j,ij}^{CB}, \forall ij \in \Upsilon \quad (38)$$

$$s_{ij}^{i,xy,A} \geq b_{ij}^{i,xy} + 1 - s_{ij}^{i,NO} - x_{i,ij}^{FTU}, \forall ij \in \Upsilon \quad (39)$$

$$s_{ij}^{j,xy,A} \geq b_{ij}^{j,xy} + 1 - s_{ij}^{j,NO} - x_{j,ij}^{FTU}, \forall ij \in \Upsilon \quad (40)$$

$$s_{ij}^{i,xy,A} \leq b_{ij}^{i,xy} + 1 - s_{ij}^{i,NO} + x_{i,ij}^{FTU}, \forall ij \in \Upsilon \quad (41)$$

$$s_{ij}^{j,xy,A} \leq b_{ij}^{j,xy} + 1 - s_{ij}^{j,NO} + x_{j,ij}^{FTU}, \forall ij \in \Upsilon \quad (42)$$

$$s_{ij}^{i,xy,M} \geq 1 - x_{i,ij}^{SW}, \forall ij \in \Upsilon \quad (43)$$

$$s_{ij}^{j,xy,M} \geq 1 - x_{j,ij}^{SW}, \forall ij \in \Upsilon \quad (44)$$

$$s_{ij}^{i,NO} \geq 1 - x_{i,ij}^{SW}, \forall ij \in \Upsilon \quad (45)$$

$$s_{ij}^{j,NO} \geq 1 - x_{j,ij}^{SW}, \forall ij \in \Upsilon \quad (46)$$

$$x_{i,ij}^{SW} \geq x_{i,ij}^{FTU}, \forall ij \in \Upsilon \quad (47)$$

$$x_{j,ij}^{SW} \geq x_{j,ij}^{FTU}, \forall ij \in \Upsilon \quad (48)$$

$$\sum_{ij \in \Upsilon} (x_{i,ij}^{RTU} + x_{j,ij}^{RTU}) \leq Mx^{CCS} \quad (49)$$

$$x_{i,ij}^{SW} \geq x_{i,ij}^{CB}, \forall ij \in \Upsilon \quad (50)$$

$$x_{j,ij}^{SW} \geq x_{j,ij}^{CB}, \forall ij \in \Upsilon \quad (51).$$

(3) The reliability evaluation optimization model is solved based on the target function (1) and the constraint conditions (2)-(51) through software CPLEX or Gurobi, to obtain optimum solutions of $x_{i,ij}^{CB}$, $x_{j,ij}^{CB}$, $x_{i,ij}^{SW}$, $x_{j,ij}^{SW}$, $x_{i,ij}^{FTU}$, $x_{j,ij}^{FTU}$, $x^{CCS}$, $CID_i$, $CIF_i$, SAIDI, SAIFI, ASAI and EENS. The optimum solutions of $x_{i,ij}^{CB}$, $x_{j,ij}^{CB}$, $x_{i,ij}^{SW}$, $x_{j,ij}^{SW}$, $x_{i,ij}^{FTU}$, $x_{j,ij}^{FTU}$, $x_{CCS}$ are optimum results of planning installation states of the circuit breaker, the switch, the feeder terminal unit, and the control center. The optimum solutions of $CID_i$, $CIF_i$, SAIDI, SAIFI, ASAI and EENS are optimum results of a reliability index of a planning scheme. The planning may be performed on the power distribution automation system based on the above optimum results, which may effectively reduce the investment cost on the premise of ensuring the system reliability.

According to an embodiment of the present disclosure, a planning device for a power distribution automation system based on a reliability constraint is provided. The device includes a processor; and a memory for storing instructions executable by the processor. The processor is configured to perform the planning method for the power distribution automation system according to the abovementioned embodiment of the present disclosure.

With respect to the devices in the above embodiments, the specific manners for performing operations for individual modules therein have been described in detail in the embodiments regarding the channel decoding method methods, which will not be elaborated herein.

According to an embodiment of the present disclosure, a non-transitory computer-readable storage medium is provided. The non-transitory computer-readable storage medium has stored therein instructions that, when executed by a processor, causes the processor to perform the planning method for the power distribution automation system according to the abovementioned embodiment of the present disclosure.

It should be noted that, although the present disclosure has been described with reference to the embodiments, it will be appreciated by those skilled in the art that the disclosure includes other examples that occur to those skilled in the art to execute the disclosure. Therefore, the present disclosure is not limited to the embodiments.

It will be understood that, the flow chart or any process or method described herein in other manners may represent a module, segment, or portion of code that comprises one or more executable instructions to implement the specified logic function(s) or that comprises one or more executable instructions of the steps of the progress. Although the flow chart shows a specific order of execution, it is understood that the order of execution may differ from that which is depicted. For example, the order of execution of two or more boxes may be scrambled relative to the order shown. Also, two or more boxes shown in succession in the flow chart may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure. Also, the flow chart is relatively self-explanatory and is understood by those skilled in the art to the extent that software and/or hardware can be created by one with ordinary skill in the art to carry out the various logical functions as described herein.

The logic and step described in the flow chart or in other manners, for example, a scheduling list of an executable instruction to implement the specified logic function(s), it can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the printer registrar for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Although the device, system, and method of the present disclosure is embodied in software or code executed by general purpose hardware as discussed above, as an alternative the device, system, and method may also be embodied in dedicated hardware or a combination of software/general purpose hardware and dedicated hardware. If embodied in dedicated hardware, the device or system can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

It can be understood that all or part of the steps in the method of the above embodiments can be implemented by instructing related hardware via programs, the program may be stored in a computer readable storage medium, and the program includes one step or combinations of the steps of the method when the program is executed.

In addition, each functional unit in the present disclosure may be integrated in one progressing module, or each functional unit exists as an independent unit, or two or more functional units may be integrated in one module. The integrated module can be embodied in hardware, or software. If the integrated module is embodied in software and sold or used as an independent product, it can be stored in the computer readable storage medium.

The computer readable storage medium may be, but is not limited to, read-only memories, magnetic disks, or optical disks.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A planning method for a power distribution automation system based on a reliability constraint, comprising:
defining installation states of components and principles of a fault isolation, a load transfer and a fault recovery after a branch fault occurs;
establishing a reliability evaluation optimization model for a power distribution network based on a mixed integer linear programming, the reliability evaluation optimization model comprising a target function and constraint conditions;
solving the reliability evaluation optimization model to obtain an optimum planning scheme; and
controlling the power distribution automation system based on the optimum planning scheme,
wherein solving the reliability evaluation optimization model to obtain an optimum planning scheme comprises:
solving the reliability evaluation optimization model to obtain optimum solutions of $x_{i,ij}^{CB}$, $x_{j,ij}^{CB}$, $x_{i,ij}^{SW}$, $x_{j,ij}^{SW}$, $x_{i,ij}^{FTU}$, $x_{j,ij}^{CB}$, $x^{CCS}$, $CID_i$, $CIF_i$, SAIDI, SAIFI, ASAI and EENS, wherein the optimum solutions of $x_{i,ij}^{CB}$ and $x_{j,ij}^{CB}$ are optimum results of a planning installation state of a circuit breaker, the optimum solutions of $x_{i,ij}^{SW}$ and $x_{j,ij}^{SW}$ are optimum results of a planning installation state of a switch, the optimum solutions of $x_{i,ij}^{FTU}$ and $x_{j,ij}^{FTU}$ are optimum results of a planning installation state of a feeder terminal unit, the optimum solution of $x^{CCS}$ is an optimum result of a planning installation state of a control center, and the optimum solutions of $CID_i$, $CIF_i$, SAIDI, SAIFI, ASAI and EENS are optimum results of a reliability index of the planning scheme.

2. The method of claim 1, wherein defining the installation states of the components and the principles of the fault isolation, the load transfer and the fault recovery after the branch fault occurs comprises:

installing the circuit breaker and the switch at both ends of a branch, installing the feeder terminal units in the circuit breaker and the switch respectively, the feeder terminal unit being configured to receive an instruction from the control center to control the circuit breaker and the switch to turn on or off, and the circuit breaker being turned off in a normal operating state;

after the branch fault occurs, disconnecting a circuit breaker closest to a fault branch upstream of the branch, interrupting a fault current, and powering off a node downstream of the circuit breaker;

in an automatic action stage, turning on or off all the switches installed with the feeder terminal units in the power distribution network for automatic fault isolation, isolating the fault branch, and performing network reconfiguration based on all the switches installed with the feeder terminal units and all the circuit breakers installed with the feeder terminal units to restore a load of the node powered off;

in a manual action stage, operating all the switches and all the circuit breakers manually to further restore the load of the node powered off; and repairing the fault branch, and restoring an original structure of the power distribution network through the switches and the circuit breakers after the fault branch is repaired.

3. The method of claim 1, wherein establishing the reliability evaluation optimization model for the power distribution network based on the mixed integer linear programming comprises:

determining the target function of the reliability evaluation optimization model; and determining the constraint conditions of the reliability evaluation optimization model.

4. The method of claim 3, wherein the target function of the reliability evaluation optimization model is denoted by a formula of:

Minimize: $c^{Total} = \Upsilon[c^{CB}(x_{i,ij}^{CB} + x_{j,ij}^{CB}) + c^{SW}(x_{i,ij}^{SW} + x_{j,ij}^{SW}) + c^{FTU}(x_{i,ij}^{FTU} + x_{j,ij}^{FTU})] + c^{CCS}x^{CCS}$ (1)

where $c^{Total}$ represents a comprehensive investment cost of the power distribution network, $c^{CB}$ represents an investment cost of one circuit breaker, $x_{i,ij}^{CB}$ represents a variable 0 or 1 of an installation state of a circuit breaker closest to a node i in a branch ij, $x_{i,ij}^{CB}=1$ represents an installed state of the circuit breaker closest to the node i, $x_{i,ij}^{CB}=0$ represents an uninstalled state of the circuit breaker closest to the node j, $x_{j,ij}^{CB}$ represents a variable 0 or 1 of an installation state of a circuit breaker closest to a node j in the branch ij, $x_{j,ij}^{CB}=1$ represents an installed state of the circuit breaker closest to the node j, $x_{j,ij}^{CB}=0$ represents an uninstalled state of the circuit breaker closest to the node j, $c^{SW}$ represents an investment cost of one switch, $x_{i,ij}^{SW}$ represents a variable 0 or 1 of an installation state of a switch closest to the node i in the branch ij, $x_{i,ij}^{SW}=1$ represents an installed state of the switch closest to the node i, $x_{i,ij}^{SW}=0$ represents an uninstalled state of the switch closest to the node i, $x_{j,ij}^{SW}$ represents a variable 0 or 1 of an installation state of a switch closest to the node j in the branch ij, $x_{j,ij}^{SW}=1$ represents an installed state of the switch closest to the node j, $x_{j,ij}^{SW}=0$ represents an uninstalled state of the switch closest to the node j, $c^{FTU}$ represents an investment cost of one feeder terminal unit, $x_{i,ij}^{FTU}$ represents a variable 0 or 1 of an installation state of a feeder terminal unit closest to the node i in the branch ij, $x_{i,ij}^{FTU}=1$ represents an installed state of the feeder terminal unit closest to the node i, $x_{i,ij}^{FTU}=0$ represents an uninstalled state of the feeder terminal unit closest to the node i, x represents a variable 0 or 1 of an installation state of a feeder terminal unit closest to the node j in the branch ij, $x_{j,ij}^{FTU}=1$ represents an installed state of the feeder terminal unit closest to the node j, $x_{j,ij}^{FTU}=0$ represents an uninstalled state of the feeder terminal unit closest to the node j, $c^{CCS}$ represents an investment cost of the control center, $x^{CCS}$ represents a variable 0 or 1 of a construction state of the control center, $x^{CCS}=1$ represents a constructed state of the control center, and $x^{CCS}=0$ represents a non-construction state of the control center.

5. The method of claim 3, wherein the constraint conditions of the reliability evaluation optimization model comprises:

a power balance constraint of the power distribution network;
a capacity constraint of the branch;
a capacity constraint of a transformer;
an action constraint of the circuit breaker;
an action constraint of the switch;
a reliability constraint; and
a device investment constraint.

6. The method of claim 5, wherein the power balance constraint of the power distribution network is denoted by formulas of:

$$D_i^{xy,sc} = \sum_{j \in \Psi_i} P_{ji}^{xy,sc}, \forall i \in \Psi^{LN}, \forall xy \in \Upsilon, sc \in \{A, M\} \quad (2)$$

$$P_{ij}^{xy,sc} = -P_{ji}^{xy,sc}, \forall ij \in \Upsilon, \forall xy \in \Upsilon, sc \in \{A, M\} \quad (3)$$

where a superscript xy represents a scenario where the branch fault occurs in a branch xy; in the $sc \in \{A, M\}$, sc represents a stage, A represents the automatic action stage, and M represents the manual action stage; $D_i^{xy,sc}$ represents a load of a node i when the branch fault occurs in the branch xy, $P_{ji}^{xy,sc}$ represents a power of a branch ij flowing from a node j to the node i when the branch fault occurs in the branch xy, $\Psi_i$ represents a collection of branches directly connected to the node i, $\Psi^{LN}$ represents a collection of load nodes, $\Upsilon$ represents a collection of all the branches, and $\forall xy \in \Upsilon$ represents a scenario where the branch faults occur in all the branches.

7. The method of claim 5, wherein the capacity constraint of the branch is denoted by formulas of:

$$-Ms_{ij}^{i,xy,sc} \leq P_{ij}^{xy,sc} \leq Ms_{ij}^{i,xy,sc}, \forall ij \in \Upsilon, \forall xy \in \Upsilon, sc \in \{A,M\} \quad (4)$$

$$-Ms_{ij}^{j,xy,sc} \leq P_{ij}^{xy,sc} \leq Ms_{ij}^{j,xy,sc}, \forall ij \in \Upsilon, \forall xy \in \Upsilon, sc \in \{A,M\} \quad (5)$$

$$-P_{ij}^{C} \leq P_{ij}^{xy,sc} \leq P_{ij}^{C}, \forall ij \in \Upsilon, \forall xy \in \Upsilon, sc \in \{A,M\} \quad (6)$$

where M represents a positive number, $s_{ij}^{i,xy,sc} \in \{0,1\}$ represents a variable 0 or 1 of a state of a switch closest to a node i in a branch ij when the branch fault occurs in a branch xy, $s_{ij}^{i,xy,sc}=1$ represents a closed state of the switch closest to the node i, $s_{ij}^{i,xy,sc}=0$ represents an open state of the switch closest to the node i, $s_{ij}^{j,xy,sc} \in \{0,1\}$ represents a variable 0 or 1 of a state of a switch closest to a node j in the branch ij when the branch fault occurs in the branch xy, $s_{ij}^{j,xy,sc}=1$ represents a closed state of the switch closest to the node j, $s_{ij}^{j,xy,sc}=0$ represents an open state of the switch closest to the node j, and $P_{ij}^{C}$ represents a rated transmission capacity of the branch ij.

8. The method of claim 7, wherein M ranges from 10000 to 10000000.

9. The method of claim 5, wherein the capacity constraint of the transformer is denoted by formulas of:

$$P_f^{xy,sc}=P_{tr^f}^{xy,sc}, \forall f \in \Psi^F, tr^f \in \Upsilon \forall xy \in \Upsilon, sc \in \{A,M\} \quad (7)$$

$$P_f^{xy,sc} \leq P_f^{C}, \forall f \in \Psi^F, \forall xy \in \Upsilon sc \in \{A,M\} \quad (8)$$

where $P_f^{xy,sc}$ represents a power of a transformer f when the branch fault occurs in a branch xy, $P_{tr^f}^{xy,sc}$ represents a power of a branch $tr^f$ connected to the transformer and flowing from a transformer node to a downstream node when the branch fault occurs in the branch xy, and $\Psi^F$ represents a collection of all the transformer nodes.

10. The method of claim 5, wherein the action constraint of the circuit breaker is denoted by formulas of:

$$F_{xy}^{xy,B} = 0 \quad (9)$$

$$-(2 - b_{ij}^{i,xy} - s_{ij}^{i,NO})M + F_i^{xy,B} \leq F_{ij}^{xy,B} \leq (2 - b_{ij}^{i,xy} - s_{ij}^{i,NO})M + F_i^{xy,B}, \quad (10)$$

$$\forall ij \in \Upsilon$$

$$-(2 - b_{ij}^{j,xy} - s_{ij}^{j,NO})M + F_j^{xy,B} \leq F_{ij}^{xy,B} \leq (2 - b_{ij}^{j,xy} - s_{ij}^{j,NO})M + F_j^{xy,B}, \quad (11)$$

$$\forall ij \in \Upsilon$$

$$2n^{BR} - 1 = \sum_{ij \in \Upsilon}(b_{ij}^{i,xy} + b_{ij}^{j,xy}) \quad (12)$$

$$0 \leq F_i^{xy,B} \leq 1, \forall i \in \Psi^{LN} \quad (13)$$

$$0 \leq F_{ij}^{xy,B} \leq 1, \forall ij \in \Upsilon \quad (14)$$

$$F_i^{xy,B} = 1, \forall i \in \Psi^{SS} \quad (15)$$

$$p_i^{xy} = 1 - F_i^{xy,B}, \forall i \in \Psi^{LN} \quad (16)$$

where $\forall xy \in \Upsilon$;

$F_{ij}^{xy,B}$ represents a variable 0 or 1 of a fault effect marker of a branch ij in an action stage of the circuit breaker when the branch fault occurs in a branch xy, $F_{ij}^{xy,B}=0$ represents that the branch ij is in a power-off state due to a fault effect when the branch fault occurs in the branch xy, $F_{ij}^{xy,B}=1$ represents that the branch ij is in a normal operating state when the branch fault occurs in the branch xy, $F_i^{xy,B}$ represents a variable 0 or 1 of a fault effect marker of a node i in the action stage of the circuit breaker when the branch fault occurs in the branch xy, $F_i^{xy,B}=0$ represents that the node i is in a power-off state due to a fault effect when the branch fault occurs in the branch xy, $F_i^{xy,B}=1$ represents that the node i is in a normal operating state when the branch fault occurs in the branch xy, $F_j^{xy,B}$ represents a variable 0 or 1 of a fault effect marker of a node j in the action stage of the circuit breaker when the branch fault occurs in the branch xy, $F_j^{xy,B}=0$ represents that the node j is in a power-off state due to a fault effect when the branch fault occurs in the branch xy, $F_j^{xy,B}=1$ represents that the node j is in a normal operating state when the branch fault occurs in the branch xy, a superscript B represents the action stage of the circuit breaker, $n^{BR}$ represents a number of branches of the power distribution network, and $\Psi^{SS}$ represents a set of substation nodes;

$s_{ij}^{i,NO}$ represents a variable 0 or 1 of a state of a switch closest to the node i in the branch ij in the normal operating state, $s_{ij}^{i,NO}=1$ represents a closed state of the switch closest to the node i, $s_{ij}^{i,NO}=0$ represents an open state of the switch closest to the node i, $s_{ij}^{j,NO}$ represents a variable 0 or 1 of a state of a switch closest to a node j in the branch ij in the normal operating state, $s_{ij}^{j,NO}=1$ represents a closed state of the switch closest to the node j, $s_{ij}^{j,NO}=0$ represents an open state of the switch closest to the node j, and a superscript NO represents that the branch ij is in the normal operating state;

$b_{ij}^{i,xy}$ represents a variable 0 or 1 of a state of a circuit breaker closest to the node i in the branch ij when the branch fault occurs in the branch xy, $b_{ij}^{i,xy}=1$ represents an off state of the circuit breaker closest to the node i, $b_{ij}^{i,xy}=0$ represents an on state of the circuit breaker closest to the node i, $b_{ij}^{j,xy}$ represents a variable 0 or 1 of a state of a circuit breaker closest to the node j in the branch ij when the branch fault occurs in the branch xy, $b_{ij}^{j,xy}=1$ represents an off state of the circuit breaker closest to the node j, and $b_{ij}^{j,xy}=0$ represents an on state of the circuit breaker closest to the node j; and $p_i^{xy}$ represents a variable 0 or 1 of a fault effect marker of the node i when the branch fault occurs in the branch xy, $p_i^{xy}=1$ represents that the node i is affected by the branch fault when the branch fault occurs in the branch xy, and $p_i^{xy}=0$ represents that the node i is not affected by the branch fault when the branch fault occurs in the branch xy.

11. The method of claim 5, wherein the action constraint of the switch is denoted by formulas of:

$$F_{xy}^{xy,sc}=0, sc \in \{A,M\} \quad (17)$$

$$-(1-s_{ij}^{i,xy,sc})M+F_i^{xy,sc} \leq F_{ij}^{xy,sc} \leq (1-s_{ij}^{i,xy,sc})M+F_i^{xy,sc},$$
$$\forall ij \in \Upsilon, sc \in \{A,M\} \quad (18)$$

$$-(1-s_{ij}^{j,xy,sc})M+F_j^{xy,sc} \leq F_{ij}^{xy,sc} \leq (1-s_{ij}^{j,xy,sc})M+F_j^{xy,sc},$$
$$\forall ij \in \Upsilon, sc \in \{A,M\} \quad (19)$$

$$0 \leq F_i^{xy,sc} \leq 1, \forall i \in \Psi^{LN}, sc \in \{A,M\} \quad (20)$$

$$0 \leq F_{ij}^{xy,sc} \leq 1, \forall ij \in \Upsilon, sc \in \{A,M\} \quad (21)$$

$$F_i^{xy,sc}=1, \forall i \in \Psi^{SS}, sc \in \{A,M\} \quad (22)$$

$$D_i^{xy,sc}D_i q_i^{xy,sc}, \forall i \in \Psi^{LN}, sc \in \{A,M\} \quad (23)$$

$$q_i^{xy,sc}=F_i^{xy,sc}, \forall i \in \Psi^{LN}, sc \in \{A,M\} \quad (24)$$

$$1-p_i^{xy} \leq q_i^{xy,A} \leq q_i^{xy,M}, \forall i \in \Psi^{LN} \quad (25)$$

where $\forall xy \in \Upsilon$;

$F_{ij}^{xy,sc}$ represents a variable 0 or 1 of a maintenance effect marker of a branch ij in the automatic action stage sc=A or in the manual action stage sc=M after the branch fault occurs in a branch xy, $F_{ij}^{xy,sc}=0$ represents that the branch ij is in a power-off state due to maintenance for the branch xy after the branch fault occurs in the branch xy, $F_{ij}^{xy,sc}=1$ represents that the branch ij is not affected by the maintenance for the branch xy and is in a normal operating state after the branch fault occurs in the branch xy, $F_i^{xy,sc}$ represents a variable 0 or 1 of a maintenance effect marker of a node i in the automatic action stage sc=A or in the manual action stage sc=M after the branch fault occurs in the branch xy, $F_i^{xy,sc}=0$ represents that the node i is in a power-off state due to the maintenance for the branch xy after the branch fault occurs in the branch xy, $F_j^{xy,sc}=1$ represents that the node i is not affected by the maintenance for the branch xy and is in a normal operating state after the branch fault occurs in the branch xy, Fuse represents a variable 0 or 1 of a maintenance effect marker of a node j after the branch fault occurs in the branch xy, $F_j^{xy,sc}=0$ represents that the node j is in a power-off state due to the maintenance for the branch xy after the branch fault occurs in the branch xy, and $F_j^{xy,sc}=1$ represents that the node j is not affected by the maintenance for the branch xy and is in a normal operating state after the branch fault occurs in the branch xy; and $q_i^{xy,sc}$ represents a variable 0 or 1 of a power-supply marker of the node i in the automatic action stage sc=A or in the manual action stage sc=M after the branch fault occurs in the branch xy, $q_i^{xy,sc}=1$ represents a normal power-supply state of the node i after the branch fault occurs in the branch xy and a switching action is performed, $q_i^{xy,sc}=0$ represents that the node i is in the power-off state after the branch fault occurs in the branch xy and the switching action is performed.

12. The method of claim 5, wherein the reliability constraint is denoted by formulas of:

$$CID_i = \sum_{xy\in\Upsilon} \lambda_{xy} \left[ \begin{array}{l} \tau_{xy}^{AST} p_i^{xy} + (\tau_{xy}^{MST} - \tau_{xy}^{AST})(1-q_i^{xy,A}) + \\ (\tau_{xy}^{RP} - \tau_{xy}^{MST})(1-q_i^{xy,M}) \end{array} \right], \forall i \in \Psi^{LN} \quad (26)$$

$$CIF_i = \sum_{xy\in\Upsilon} \lambda_{xy} p_i^{xy}, \forall i \in \Psi^{LN} \quad (27)$$

$$SAIDI = \frac{\sum_{i\in\Psi^{LN}} NC_i CID_i}{\sum_{i\in\Psi^{LN}} NC_i} \quad (28)$$

$$SAIFI = \frac{\sum_{i\in\Psi^{LN}} NC_i CIF_i}{\sum_{i\in\Psi^{LN}} NC_i} \quad (29)$$

$$ASAI = 1 - \frac{SAIDI}{8760} \quad (30)$$

$$EENS = \sum_{h\in B} \frac{\Delta h}{8760} \sum_{i\in\Psi^{LN}} CID_i \mu_h L_i \quad (31)$$

$$CIF_i \leq \varepsilon_i^{CIF}, \forall i \in \Psi^{LN} \quad (32)$$

$$CID_i \leq \varepsilon_i^{CID}, \forall i \in \Psi^{LN} \quad (33)$$

$$SAIFI \leq \varepsilon^{SAIFI} \quad (34)$$

$$SAIDI \leq \varepsilon^{SAIDI} \quad (35)$$

$$EENS \leq \varepsilon^{EENS} \quad (36)$$

where $CID_i$ represents a customer interruption duration of a node i, $\lambda_{xy}$ represents an annual fault rate of a branch xy, $\tau_{xy}^{AST}$ represents an interruption duration of the branch xy in the automatic action stage for the branch fault, $\tau_{xy}^{MST}$ represents an interruption duration of the branch xy in the manual action stage for the branch fault, $\tau_{xy}^{RP}$ represents an interruption duration of the branch xy in a fault maintenance, $CIF_i$ represents a customer interruption frequency of the node i, $NC_i$ represents a number of customers of the node i, SAIDI represents a system average interruption duration index, SAIFI represents a system average interruption frequency index, ASAI represents a system average power-supply index, EENS represents an expected energy not supplied, B represents a collection of all load levels, $\Delta_h$ represents a number of annual duration hours of a load level h, $\mu_h \leq 1$ represents a peak load ratio of the load level h, and $L_i$ represents a peak load of the node i; and $\varepsilon_i^{CIF}$ represents an upper limit of the customer interruption frequency of the node, i, $\varepsilon_i^{CIF}$ represents an upper limit of the customer interruption duration of the node i, $\varepsilon^{SAIFI}$ represents an upper limit of the system average interruption frequency index, $\varepsilon^{SAIDI}$ represents an upper limit of the system average interruption duration index, and $\varepsilon^{EENS}$ represents an upper limit of the expected energy not supplied.

13. The method of claim 5, wherein the device investment constraint is denoted by formulas of:

$$b_{ij}^{i,xy} \geq 1 - x_{i,ij}^{CB}, \forall ij \in \Upsilon \quad (37)$$

$$b_{ij}^{j,xy} \geq 1 - x_{j,ij}^{CB}, \forall ij \in \Upsilon \quad (38)$$

$$s_{ij}^{i,xy,A} \geq b_{ij}^{i,xy} + 1 - s_{ij}^{i,NO} - x_{i,ij}^{FTU}, \forall ij \in \Upsilon \quad (39)$$

$$s_{ij}^{j,xy,A} \geq b_{ij}^{j,xy} + 1 - s_{ij}^{j,NO} - x_{j,ij}^{FTU}, \forall ij \in \Upsilon \quad (40)$$

$$s_{ij}^{i,xy,A} \leq b_{ij}^{i,xy} + 1 - s_{ij}^{i,NO} + x_{i,ij}^{FTU}, \forall ij \in \Upsilon \quad (41)$$

$$s_{ij}^{j,xy,A} \leq b_{ij}^{j,xy} + 1 - s_{ij}^{j,NO} + x_{j,ij}^{FTU}, \forall ij \in \Upsilon \quad (42)$$

$$s_{ij}^{i,xy,M} \geq 1 - x_{i,ij}^{SW}, \forall ij \in \Upsilon \quad (43)$$

$$s_{ij}^{j,xy,M} \geq 1 - x_{j,ij}^{SW}, \forall ij \in \Upsilon \quad (44)$$

$$s_{ij}^{i,NO} \geq 1 - x_{i,ij}^{SW}, \forall ij \in \Upsilon \quad (45)$$

$$s_{ij}^{j,NO} \geq 1 - x_{j,ij}^{SW}, \forall ij \in \Upsilon \quad (46)$$

$$x_{i,ij}^{SW} \geq x_{i,ij}^{FTU}, \forall ij \in \Upsilon \quad (47)$$

$$x_{j,ij}^{SW} \geq x_{j,ij}^{FTU}, \forall ij \in \Upsilon \quad (48)$$

$$\Sigma_{ij\in\Upsilon}(x_{i,ij}^{RTU} + x_{j,ij}^{RTU}) \leq M x^{CCS} \quad (49)$$

$$x_{i,ij}^{SW} \geq x_{i,ij}^{CB}, \forall ij \in \Upsilon \quad (50)$$

$$x_{j,ij}^{SW} \geq x_{j,ij}^{CB}, \forall ij \in \Upsilon \quad (51).$$

14. A planning device for a power distribution automation system based on a reliability constraint, comprising:
a processor; and
a memory for storing instructions executable by the processor;
wherein the processor is configured to:

define installation states of components and principles of a fault isolation, a load transfer and a fault recovery after a branch fault occurs;

establish a reliability evaluation optimization model for a power distribution network based on a mixed integer linear programming, the reliability evaluation optimization model comprising a target function and constraint conditions;

solve the reliability evaluation optimization model to obtain an optimum planning scheme; and control the power distribution automation system based on the optimum planning scheme, wherein the processor is further configured to:

solve the reliability evaluation optimization model to obtain optimum solutions of $x_{i,ij}^{CB}$, $x_{j,ij}^{CB}$, $x_{i,ij}^{SW}$, $x_{j,ij}^{SW}$, $x_{i,ij}^{FTU}$, $x_{j,ij}^{FTU}$, $x^{CCS}$, $CID^i$, $CIF^i$, SAIDI, SAIFI, ASAI and EENS, wherein the optimum solutions of $x_{i,ij}^{CB}$ and $x_{j,ij}^{CB}$ are optimum results of a planning installation state of a circuit breaker, the optimum solutions of $x_{i,ij}^{SW}$ and $x_{j,ij}^{SW}$ are optimum results of a planning installation state of a switch, the optimum solutions of $x_{i,ij}^{FTU}$ and $x_{j,ij}^{FTU}$ are optimum results of a planning installation state of a feeder terminal unit, the optimum solution of $x^{CCS}$ is an optimum result of a planning installation state of a control center, and the optimum solutions of $CID_i$, $CIF_i$, SAIDI, SAIFI, ASAI and EENS are optimum results of a reliability index of the planning scheme.

15. The device of claim 14, wherein the processor is configured to:

install the circuit breaker and the switch at both ends of a branch, install the feeder terminal units in the circuit breaker and the switch respectively, the feeder terminal unit being configured to receive an instruction from the control center to control the circuit breaker and the switch to turn on or off, and the circuit breaker being turned off in a normal operating state;

after the branch fault occurs, disconnect a circuit breaker closest to a fault branch upstream of the branch, interrupt a fault current, and power off a node downstream of the circuit breaker;

in an automatic action stage, turn on or off all the switches installed with the feeder terminal units in the power distribution network for automatic fault isolation, isolate the fault branch, and perform network reconfiguration based on all the switches installed with the feeder terminal units and all the circuit breakers installed with the feeder terminal units to restore a load of the node powered off;

in a manual action stage, operate all the switches and all the circuit breakers manually to further restore the load of the node powered off; and repair the fault branch, and restore an original structure of the power distribution network through the switches and the circuit breakers after the fault branch is repaired.

16. The device of claim 14, wherein the processor is configured to:

determine the target function of the reliability evaluation optimization model; and determine the constraint conditions of the reliability evaluation optimization model.

17. The device of claim 16, wherein the target function of the reliability evaluation optimization model is denoted by a formula of:

$$\text{Minimize: } c^{Total} = \Upsilon[c^{CB}(x_{i,ij}^{CB}+x_{j,ij}^{CB})+c^{SW}(x_{i,ij}^{SW}+x_{j,ij}^{SW})+c^{FTU}(x_{i,ij}^{FTU}+x_{j,ij}^{FTU})]+c^{CCS}x^{CCS} \quad (1)$$

where $c^{Total}$ represents a comprehensive investment cost of the power distribution network, $c^{CB}$ represents an investment cost of one circuit breaker, $x_{i,ij}^{CB}$ represents a variable 0 or 1 of an installation state of a circuit breaker closest to a node i in a branch ij, $x_{i,ij}^{CB}=1$ represents an installed state of the circuit breaker closest to the node i, $x_{i,ij}^{CB}=0$ represents an uninstalled state of the circuit breaker closest to the node i, $x_{j,ij}^{CB}$ represents a variable 0 or 1 of an installation state of a circuit breaker closest to a node j in the branch ij, $x_{j,ij}^{CB}=1$ represents an installed state of the circuit breaker closest to the node j, $x_{j,ij}^{CB}=0$ represents an uninstalled state of the circuit breaker closest to the node j, $c^{SW}$ represents an investment cost of one switch, $x_{i,ij}^{SW}$ represents a variable 0 or 1 of an installation state of a switch closest to the node i in the branch ij, $x_{i,ij}^{SW}=1$ represents an installed state of the switch closest to the node i, $x_{i,ij}^{SW}=0$ represents an uninstalled state of the switch closest to the node i, $x_{j,ij}^{SW}$ represents a variable 0 or 1 of an installation state of a switch closest to the node j in the branch ij, $x_{j,ij}^{SW}=1$ represents an installed state of the switch closest to the node j, $x_{j,ij}^{SW}=0$ represents an uninstalled state of the switch closest to the node j, $c^{FTU}$ represents an investment cost of one feeder terminal unit, $x_{i,ij}^{FTU}$ represents a variable 0 or 1 of an installation state of a feeder terminal unit closest to the node i in the branch ij, $x_{i,ij}^{FTU}=1$ represents an installed state of the feeder terminal unit closest to the node i, $x_{i,ij}^{FTU}=0$ represents an uninstalled state of the feeder terminal unit closest to the FTU represents a variable 0 or 1 of an installation state of a feeder terminal unit node i, $x_{j,ij}^{FTU}$ closest to the node j in the branch ij, $x_{j,ij}^{FTU}=1$ represents an installed state of the feeder terminal unit closest to the node j, $x_{j,ij}^{FTU}=0$ represents an uninstalled state of the feeder terminal unit closest to the node j, $c^{CCS}$ represents an investment cost of the control center, $x^{CCS}$ represents a variable 0 or 1 of a construction state of the control center, $x^{CCS}=1$ represents a constructed state of the control center, and $x^{CCS}=0$ represents a non-construction state of the control center.

18. The device of claim 16, wherein the constraint conditions of the reliability evaluation optimization model comprises:

a power balance constraint of the power distribution network;

a capacity constraint of the branch;

a capacity constraint of a transformer;

an action constraint of the circuit breaker;

an action constraint of the switch;

a reliability constraint; and a device investment constraint.

19. A non-transitory computer-readable storage medium having stored therein instructions that, when executed by a processor, causes the processor to perform a planning method for a power distribution automation system based on a reliability constraint, the method comprising:

defining installation states of components and principles of a fault isolation, a load transfer and a fault recovery after a branch fault occurs;

establishing a reliability evaluation optimization model for a power distribution network based on a mixed integer linear programming, the reliability evaluation optimization model comprising a target function and constraint conditions;

solving the reliability evaluation optimization model to obtain an optimum planning scheme; and controlling the power distribution automation system based on the optimum planning scheme, wherein solving the reliability evaluation optimization model to obtain an optimum planning scheme comprises:

solving the reliability evaluation optimization model to obtain optimum solutions of $x_{i,ij}^{CB}$, $x_{j,ij}^{CB}$, $x_{i,ij}^{SW}$, $x_{j,ij}^{SW}$, $x_{i,ij}^{FTU}$, $x_{j,ij}^{FTU}$, $x^{CCS}$, $CID^i$, $CIF^i$, SAIDI, SAIFI, ASAI and EENS, wherein the optimum solutions of $x_{i,ij}^{CB}$ and $x_{j,ij}^{CB}$ are optimum results of a planning installation state of a circuit breaker, the optimum solutions of $x_{i,ij}^{SW}$ and $x_{j,ij}^{SW}$ are optimum results of a planning installation state of a switch, the optimum solutions of $x_{i,ij}^{FTU}$ and $x_{j,ij}^{FTU}$ are optimum results of a planning installation state of a feeder terminal unit, the optimum solution of $x^{CCS}$ is an optimum result of a planning installation state of a control center, and the optimum solutions of $CID_i$, $CIF_i$, SAIDI, SAIFI, ASAI and EENS are optimum results of a reliability index of the planning scheme.

* * * * *

UNITED STATES PATENT AND TRADEMARK OFFICE
CERTIFICATE OF CORRECTION

| | |
|---|---|
| PATENT NO. | : 12,204,304 B2 |
| APPLICATION NO. | : 17/724473 |
| DATED | : January 21, 2025 |
| INVENTOR(S) | : Wenchuan Wu et al. |

Page 1 of 1

It is certified that error appears in the above-identified patent and that said Letters Patent is hereby corrected as shown below:

On the Title Page

Item (54) and in the Specification Column 1, Lines 1-3 should read:
--PLANNING METHOD FOR POWER DISTRIBUTION AUTOMATION SYSTEM CONSIDERING RELIABILITY CONSTRAINTS--

Signed and Sealed this
Twenty-fifth Day of March, 2025

Coke Morgan Stewart
*Acting Director of the United States Patent and Trademark Office*